US006106262A

United States Patent [19]

Levin et al.

[11] Patent Number: 6,106,262

[45] **Date of Patent: *Aug. 22, 2000**

[54] PRESS SIMULATION APPARATUS

[75] Inventors: Michael Levin, West Orange, N.J.; Lev Tsygan; Semen Dukler, both of Brooklyn, N.Y.

[73] Assignee: Metropolitan Computing Corporation, East Hanover, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/998,536

[22] Filed: Dec. 25, 1997

[51] Int. Cl.[7] .................................................... B29C 43/24

[52] U.S. Cl. .......................... 425/140; 425/193; 425/345; 425/353

[58] Field of Search .................................... 425/345, 353, 425/354, 193, 140, 149, 150

[56] References Cited

U.S. PATENT DOCUMENTS

| | | | |
|---|---|---|---|
| 3,255,715 | 6/1966 | Knoechi et al. . | |
| 3,734,663 | 5/1973 | Holm | 425/147 |
| 4,016,744 | 4/1977 | Williams et al. | 73/11.01 |
| 4,030,868 | 6/1977 | Williams | 73/11.01 |
| 4,057,381 | 11/1977 | Korsch | 425/345 |
| 4,099,239 | 7/1978 | Williams | 702/82 |
| 4,100,598 | 7/1978 | Stiel et al. | 364/476.01 |
| 4,121,289 | 10/1978 | Stiel | 702/84 |
| 4,408,975 | 10/1983 | Hack | 425/231 |
| 4,569,650 | 2/1986 | Kramer | 425/405.1 |
| 4,570,229 | 2/1986 | Breen et al. | 364/476.01 |
| 4,680,158 | 7/1987 | Hinzpeter et al. | 264/40.5 |
| 4,817,006 | 3/1989 | Lewis | 364/476.01 |
| 4,880,373 | 11/1989 | Balog et al. | 425/149 |
| 5,017,122 | 5/1991 | Staniforth | 425/100 |
| 5,116,214 | 5/1992 | Korsche et al. | 425/345 |
| 5,148,740 | 9/1992 | Arndt et al. | 100/264 |
| 5,151,280 | 9/1992 | Arndt et al. | 425/193 |
| 5,202,067 | 4/1993 | Solazzi et al. | 264/40.5 |
| 5,211,964 | 5/1993 | Prthyerch et al. | 425/140 |
| 5,229,044 | 7/1993 | Shimada et al. | 264/40.5 |
| 5,288,440 | 2/1994 | Katagiri et al. | 264/40.5 |
| 5,462,427 | 10/1995 | Kramer | 425/231 |
| 5,491,647 | 2/1996 | O'Brian et al. | 701/99 |
| 5,517,871 | 5/1996 | Pento | 73/865.9 |
| 5,607,704 | 3/1997 | Schlierenkamper et al. | 425/183 |

OTHER PUBLICATIONS

S. D. Bateman, A comparative investigation of compression simulators, 1989.

Ali Nokhodchi, Compaction simulators in tableting research, 1996.

*Primary Examiner*—Tim Heitbrink

*Attorney, Agent, or Firm*—Gibbons, Del Deo, Dolan, Griffinger & Vecchione

[57] ABSTRACT

An apparatus for reproducing compaction and ejection events in a plurality of press machines is disclosed. Each press machine has at least one die opening wherein a compound is placed to be compressed at least once between upper and lower punches sliding inside the said die whereupon the compressed compound is ejected from the die cavity. The apparatus and methods ensure that the plurality of compression and ejection events have the same exact speed, profile curvature, and pressure or force as on any pre-specified press machine by matching the timing and geometrical path of the punch movements as well as the depth of fill of the die. The linear speed of the punches is matched by a computer controlling the programmable motor of the die carrier. The path profiles of the punches are matched mechanically by means of interchangeable rollers and cams with the predefined geometry. The pressure or forces of the matching events are controlled and adjusted by means of the positioning of the lower punch in the die.

10 Claims, 4 Drawing Sheets

PRESS SIMULATION APPARATUS

FIELD OF THE INVENTION

This invention relates to methods of simulating events taking place in a plurality of press machines, each press machine having at least one die opening and matching upper and lower punches

BACKGROUND OF THE INVENTION

There exists a multitude of press machines that are presently in widespread use for compacting powdered materials into solid or semisolid form by exerting force on at least one set of two opposing punches or pistons entering once or twice a plurality of dies or pressing matrices containing the material to be compacted (e.g. U.S. Pat. Nos. 4,408,975 to Hack, 4,569,650 to Krämer, 4,680,158 to Hinzpefer et al., 4,880,373 to Balog et al., 5,017,122 to Staniforth, 5,116,214 to Korsch et al., 5,148,740 to Arndt et al., 5,202,067 to Solazzi et al., 5,211,964 to Prytherch et al., 5,462,427 to Kr ämer and 5,607,704 to Schlierenkämper et al.). A number of inventions relate to press machine instrumentation (e.g. 3,255,716 to Knoechel et al., 4,016,744, 4,030,868 and 4,099,239 to Williams, 4,100,598 to Stiel et al., 5,229,044 to Shimada et al.) and control (e.g. 3,734,663 to Holm, 4,121,289 to Stiel, 4,570,229 to Breen et al., 4,817,006 to Lewis, 5,288,440 to Katagiri et al., 5,491,647 to O'Brien et al.).

The examples of applications using press machines include pharmaceutical tablets and caplets, coal briquettes, ammunition, nuclear pellets, metal and plastic machine parts, ceramic isolators, catalysts or ferments, briquettes for X-ray spectrochemical analysis, grain pellets, coins, and so on.

In a compaction process, the mechanical and other properties of the compound are influenced primarily by powder composition, as well as by speed, movement profile and the force of punches that are in contact with the powder under compression. In a typical production environment, compressed products are usually made in large quantities at fast speeds. During a product development stage and for process troubleshooting, smaller quantities of the powder are often available while the press machines may be much slower and, in general, quite different from those used in production. For a product and process optimization, therefore, it is desirable to be able to reproduce typical production conditions to avoid problems in the scale-up of processing factors.

In the prior art, compaction simulators based on hydraulic actuators are used for the purpose of mimicking the compaction profile of different press machines. Typically, a pump pushes pressurized oil to the cylinder units that, in turn, move the punch holders with the help of valves and hydraulic tanks. The movement of the two punches entering the die cavity with the material to be compacted can be controlled by the actuators in order to follow any prescribed path. The path is specified in the form of a geometrical function (such as a sinusoid or a tooth-saw waveform) or may have any arbitrary form as recorded during a compaction event on another press machine with the aim of mimicking this event on the simulator. The recording from another press machine may contain either the punch displacement path or the force change profile. The desired path, whether theoretical or empirical, is further digitized by a computer, and a series of discrete commands are then given to the hydraulic actuators that are diligently reproducing either the movement of the punches or the force curve (see, e.g. U.S. Pat. No. 5,517,871 to Pento).

There are several problems with the existing compaction simulators that render them practically useless for process scale-up:

The hydraulic actuators can follow any prescribed path but theoretical paths such as a sinusoid are not representing the punch movements in the production press. Fixed geometry of the functions used to produce theoretical waveforms do not take into account the compressibility of the powders under compression (for force curve simulation) or the mechanical deformation of the punches and press assembly (for punch displacement simulation).

The empirical waveform that can be obtained from a production press depends on the brand and model of the press, the shape and size of the tooling, the production rate and the viscoelastic stress/strain behavior of the powder being compressed. Since the composition of optimized powder is unknown during the development stage, the present art solution is to use powder "similar" to the one being developed even though the degree of similarity can never be quantified or made sufficient for quantitative analysis of the compatibility. In addition, the multitude of possible values of such factors as tooling, press speed and geometry make this empirical approach to compaction simulation highly impractical.

In the currently available compaction simulators, the motion of punches is controlled by hydraulic actuators that periodically compare the current position or the force of the punches with the digitized prescription. Such comparison and the subsequent correction can not be made with sufficient frequency to assure smooth trajectory without jerking or tooth-saw like movement, even with the fastest reported data acquisition and control rate of 5 kHz per channel.

In the currently available compaction simulators, there is a choice of simulating either the motion of the punches (punch penetration curves) or the force/time path (compression profile). It is impossible to mimic both.

As a result, there is a wide discrepancy between the resulting properties of compounds obtained from different simulators following the same prescribed path for the same compound. The reported difference of 10 to 16 percent have been attributed to elastic distortion and loading characteristics of the hydraulic systems.

SUMMARY OF THE INVENTION

The objective of this invention is to eliminate drawbacks of the currently available press simulators and the method they employ. The present invention provides new and improved methods of simulating any press machine and describes specifically a press simulating apparatus that represents but one embodiment of the methods described.

Specifically, the new methods include replication of the geometrical parameters of the press machines to be simulated, without any need for mimicking the punch path with the help of hydraulic mechanisms. The punch and die sets are selected to be identical with the target press machine to be simulated, while the geometry of compression and pre-compression path generating surfaces is maintained by means of interchanging wheels, so that the punches are forced to repeat the path of the target press due to mechanical dimensions of the tooling and the press parts involved.

In a preferred embodiment of the methods, the punches are moving in a linear motion with the help of a belt. Since the arrangement is not rotary, the amount of powder required can be tightly controlled, and in fact, only one compound at a time can be produced and evaluated. The speed of the apparatus may be governed by means of a stepper or servomotor under a computer control that may match the desired speed of a target press in terms of the linear velocity of the punches.

The ejection of the compound from the die can follow the pattern of the target press by means of interchangeable eject cams that will repeat geometry of the cams on the presses to be simulated.

The punch displacement, as well as the force of pre-compression, compaction, and ejection can be measured by means of appropriate sensors known in the art.

The apparatus may be also equipped with a device for measuring the mechanical properties of each compound as it comes out of the die. In the proposed embodiment of the apparatus for pharmaceutical applications, each tablet after ejection can be positioned in a tablet tester for measurement of weight, thickness, diameter, or hardness. Immediate correlation between compression force or speed and the tablet properties can be established and displayed on the computer screen.

Thus the product and process can be optimized on the proposed apparatus using the proposed methods of simulating any press without a need for prescribing a specific digitized punch path or involving sophisticated and expensive hydraulic mechanisms. No measurement of punch displacement or forces are required albeit beneficial for quality control and experimental design.

BRIEF DESCRIPTION OF THE FIGURES

In order to facilitate a better understanding of this invention, reference is made to the following description of an exemplary embodiment thereof, referring to the accompanying drawings, in which.

PREFERRED EMBODIMENT OF THE INVENTION

Although the present invention, as an apparatus or method, can be used in a variety of processes involving press machines for compacting many powdered materials, an exemplary embodiment of the methods and apparatus under discussion with application to pharmaceutical tableting will now be discussed in detail with reference to FIGS. 1 to 4.

Figure 1:
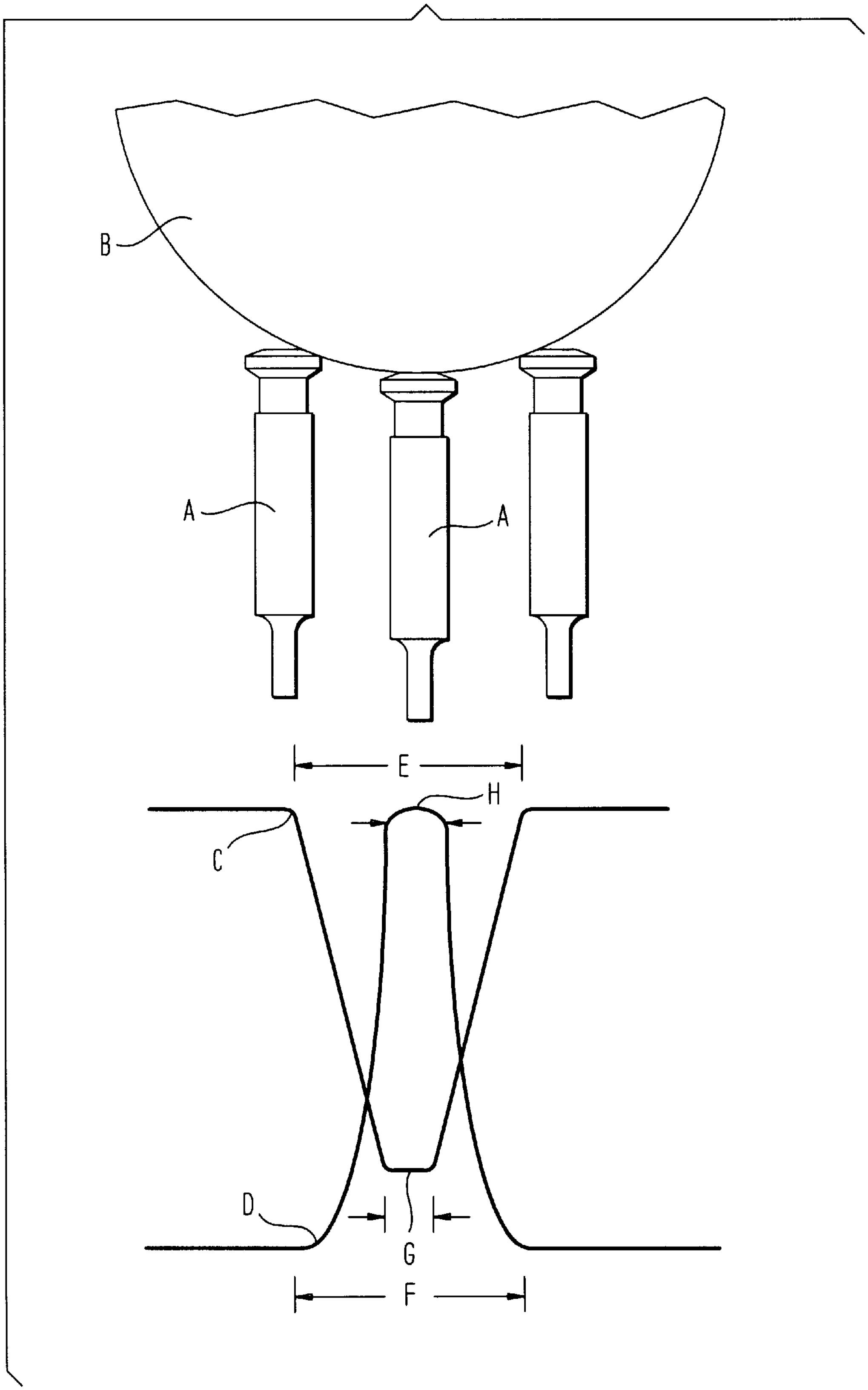
FIG. 1 illustrates a schematic view demonstrating terms that describe the compaction process and are useful for understanding of the invention.

Referring to FIG. 1, as a punch A comes in contact with the compression wheel B in any press machine having such parts, the punch displacement profile C and the force/time curve D mark the beginning of what is known as the contact time (indicated for the two curves by E and F, respectively). In the following discussion, contact time is therefore defined as the time when a punch head is in contact with the compression wheel.

Dwell time (indicated by G on the punch displacement profile and by H on the force/time curve) is defined as the time when the flat portion of the punch head is in a contact with the compression wheel while the punch does not move in a vertical direction.

It is the matching of the contact time, the dwell time, and the shape of both the punch displacement profile and the force/time curve that needs to be achieved for a proper compression event simulation. The methods of press machine simulation discussed here prescribe the matching of geometrical shapes of the process parts involved (such as, e.g., the punch shape and size, compression wheel diameter, linear speed) while the force is matched by adjusting the amount of powder to be compacted.

The said linear speed is calculated by computer in order to simulate a preferred production rate of a target press in terms of tablet per hour translated into a corresponding dwell or contact time.

To simulate a pharmaceutical rotary tablet press normally operating in the range of dwell times between 5 and 20 ms with the vertical compression forces ranging from 10 to 50kN, a device can be built that will drive the punches with the same speed and force while preserving the geometry of the tooling and press members that come in contact with the punches, such as compression or pre-compression wheels.

Figure 2:
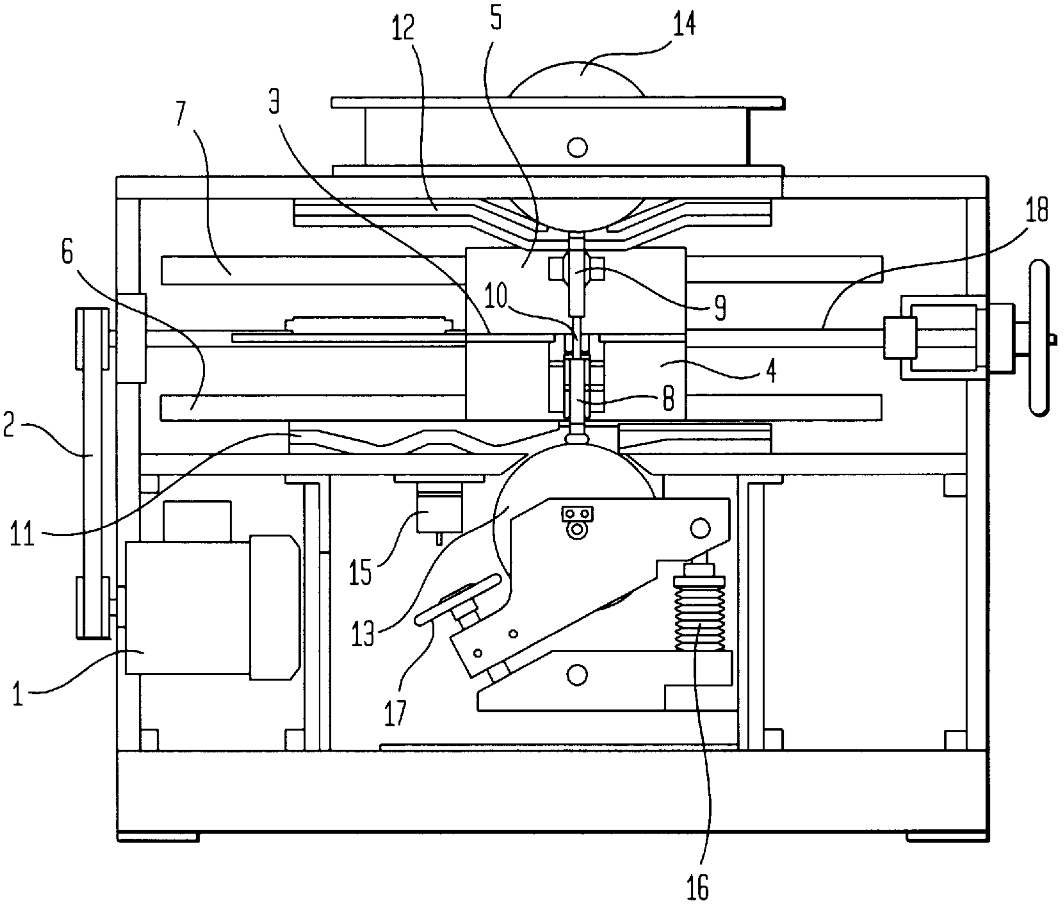
FIG. 2 represents a front view of a simplified press simulation apparatus with the interchangeable compression wheels, constructed with one exemplary embodiment of the present invention, the press simulation apparatus being arbitrarily sectioned and simplified in the drawing to facilitate discussion and illustration.

In FIG. 2 a view of an embodiment of a press simulating apparatus driven by a motor 1 acting through a belt drive 2 on a belt driven linear positioning carriage 3 consisting of a lower platform 4 and an upper platform 5 and moving on the lower rail 6 and upper rail 7, respectively is shown. The programmed parameters of the motor movement ensure that the linear speed of the carriage 3 is adequately matching the required contact or dwell time of the simulated press machine. In addition, the carriage 3 can be moved manually.

The lower platform 4 has provisions for holding lower punch 8 while the upper platform 5 has provisions for holding upper punch 9 while the powder pressing cavity means, e.g., a die cavity or a pressing matrix 10 is located between the punches.

At the beginning of a compaction cycle, the carriage 3 is stationery in the leftmost position where the die cavity 10 is filled with the powder to be compacted, either by hand or by means of a gravity feed hopper (not illustrated). At the push of a button on the apparatus or a virtual button on the controlling computer screen, the motor which is under computer control is instructed to start moving the carriage 3 from left to right, with the punches 8 and 9 being guided by the lower 11 and upper 12 rail guides while accelerating the motion under computer control to achieve a desired constant horizontal linear speed as the carriage approaches the compression wheels 13 (lower) and 14 (upper). These wheels are mounted in such a way that they are easily replaceable by wheels of different diameter in order to match the exact wheel geometry of a simulated press machine.

Before the platforms 4 and 5 reach the compression area, the amount of powder is adjusted by means of the depth of fill cam 15 which is preset manually or by a computer driven device in order to elevate the lower punch 8 inside the die cavity 10 to a desired height so that the die cavity contains a limited amount of material to be compressed. It is a known fact that, at a constant tablet thickness (when the distance between the upper and lower punches during the maximum compression is fixed) there exists a direct proportionality between the amount of material under compression in the die and the compression force. It is by this depth of fill adjustment that the compression force and the tablet weight are controlled.

The overload protection for the compression event is achieved by a spring 16 that can be manually adjusted by a wheel 17. Alternatively, a drive assembly can be in place for automated setting of the overload force.

After the compression event, the tablet is delivered to the ejection and testing area 18. Once this is done, the carriage returns to the original leftmost position for the beginning of a new cycle.

Figure 3:
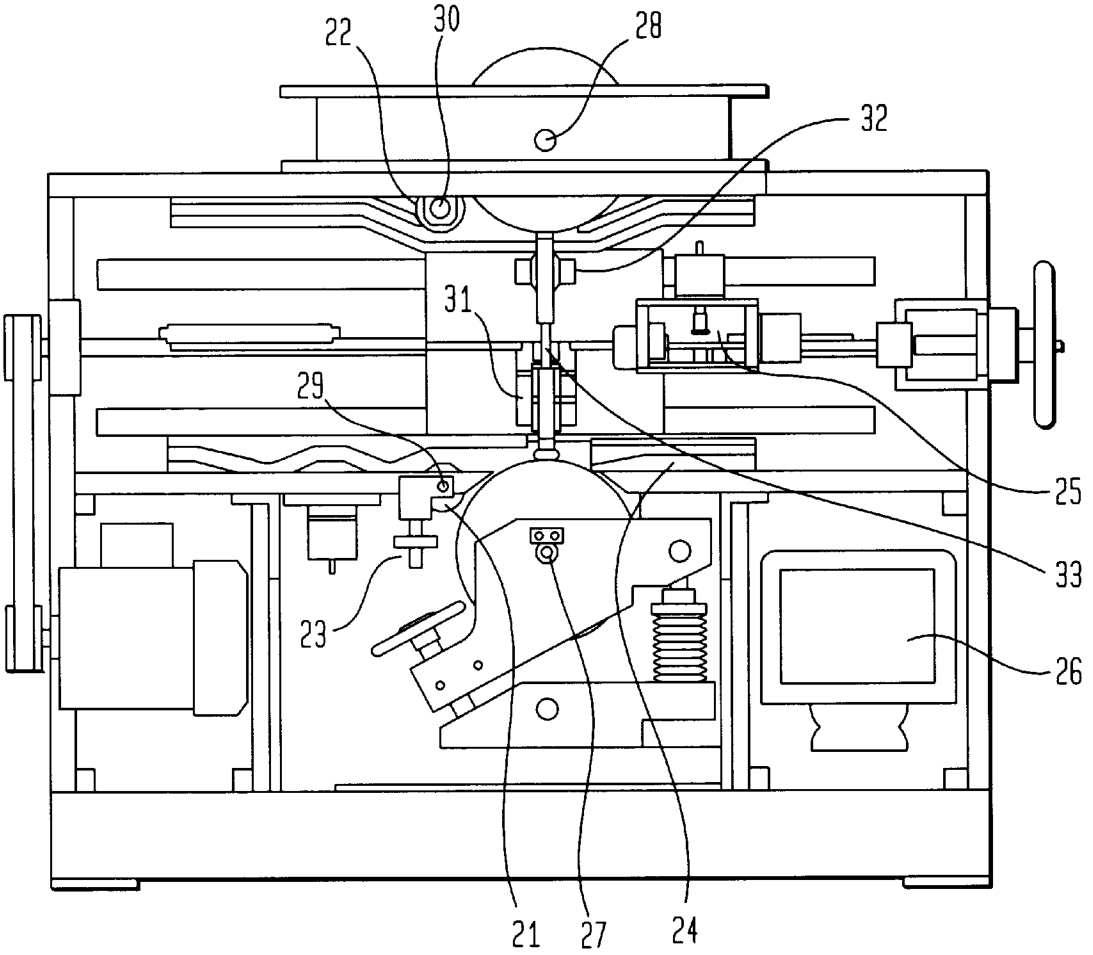
FIG. 3 is a further elaboration of a similar embodiment of the present invention with the pre-compression and compression wheels, ejection cam, tablet testing apparatus, computer controlling device and several relevant sensors in place.

Expanding on the basic design depicted in FIG. 2, additional features in FIG. 3 are mainly for the simulation of precompression and ejection events, measuring the properties of the compound and monitoring the process variables.

The lower precompression wheel 21 and the upper precompression wheel 22 are mounted in such a way that they are easily replaceable by wheels of different diameter in order to match the exact wheel geometry of a simulated press machine. The precompression force is adjusted by means of precompression adjustment mechanism 23.

Once the compound is compressed, it is delivered to the ejection area where the lower punch pushes it out of the die by means of ejection cam 24. The cam is mounted in such a way that it is easily replaceable by cams of different shape in order to match the exact cam geometry of a simulated press machine.

Once the tablet is ejected, it is delivered to the tablet testing device 25 where its properties (such as weight, hardness, thickness and diameter) are measured.

The process of press machine simulation and compaction of powder is monitored and controlled by computer, schematically depicted by 26. Specifically, the computer prescribes the required movement profile to the main drive of the apparatus in order to match the speed (contact and dwell times) of the simulated press machine. In addition, the computer can adjust other process parameters, through serial or parallel interfaces, which are well known in the art, such as tablet weight (via depth of fill) or precompression force. As an aid in product and process development, the same computer can monitor through serial or parallel interfaces, which are well known in the art, various sensors known from the prior art, such as lower compression force transducer 27, upper compression force transducer 28, lower precompression force transducer 29, upper precompression force transducer 30, lower punch displacement transducer 31, upper punch displacement transducer 32, or radial die wall pressure transducer 33, on a single or multiple display screen.

Figure 4:
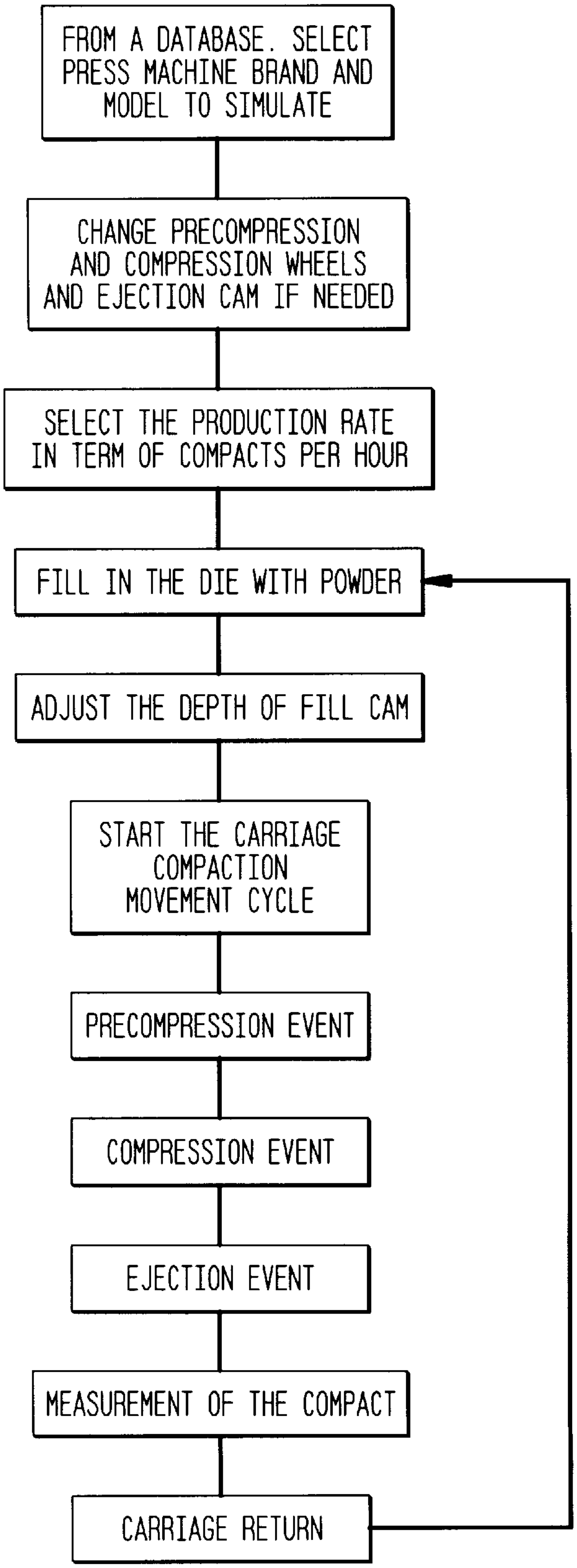
FIG. 4 represents a block diagram including an operational flow chart of the functionality referred to generally in FIG. 3 for illustrating one of the possible applications of the current invention.

Referring to FIG. 4, the user of the preferred embodiment in a first step would select a press machine brand from a database and establish the parameters of the press machine to be simulated and will make sure that all the principal geometric parameters (such as precompression and/or compression wheels, and/or the ejection cam) of the simulated press machine are matched.

In the next step, the optimal or desired production rate is selected in terms of tablet per hours and is converted into linear punch speed (in terms of contact or dwell time) by the computer.

The compaction cycle begins by filling the die or pressing matrix with powder and adjusting the depth of fill so that the die contains a required amount of powder. The carriage 3 along with punches 8 and 9 of FIG. 1 continues to move with such acceleration as is required in order to reach the desirable linear speed of the punches. With this constant speed, the punches act on the powder in the die during the precompression, compression, and ejection events.

Once the tablet is ejected, it is delivered to the tablet testing area where appropriate measurements are made while the carriage returns to its original leftmost position. Thereafter the compaction cycle of the press machine simulation can be repeated.

It must be emphasized here that the embodiment of this invention as described above is exemplary and that anyone proficient in the art can come up with modified renderings of the same methods and apparatus without departing from the scope or spirit of the invention.

We claim:

1. A linear press simulation apparatus having a lower compression wheel and an upper compression wheel, said lower compression wheel being constructed and arranged to be operatively engageable with a lower punch moans and said upper compression wheel being constructed and arranged to be operatively engageable with an upper punch means, said lower and upper punch means being arranged in opposed orientation to each other in a powder pressing cavity means, said cavity means arranged and constructed to be linearly driven between said upper and lower compression wheels to allow compression of powdered material provided wherein, said apparatus being characterized by providing replaceable lower and upper compression wheels so that the apparatus can be configured to match the exact geometry of other press machine having compression wheels of the same shape and dimensions.

2. The apparatus of claim 1 having replaceable lower and upper precompression wheels, said precompression wheels being constructed and arranged to be operatively engageable respectively with the lower and the upper punch means so as to allow the tamping and de-aerating a powdered material contained in said powder pressing cavity means, thereby supplementing the matching of compression wheel geometry by utilizing lower and upper precompression wheels selected to match the exact geometry of any other press machine having precompression wheels and the same shape and dimension.

3. The apparatus of claim 1 having a replaceable cam means being constructed and arranged to be operatively engageable with said lower punch means so as to allow the ejection of compressed powder out of the powder pressing cavity means, thereby supplementing the matching of the compression wheel geometry by utilizing a cam means selected to match the exact geometry of any other press machine having a cam means of the same shape and dimension.

4. The apparatus of claim 1 having a variable speed motor drive with a programmable control, said variable speed motor drive operatively engaging said cavity means to allow linear movement of said cavity means to match the linear speed of said upper and lower punch means when they are operatively engaged respectively wit said upper and lower compression wheels with that of other press machine having punch means and compression wheels of the same shape and dimensions.

5. The apparatus of claim 2 having a variable speed motor drive with a programmable control which motor drive is arranged and constructed to be operatively engageable with said upper and lower punch means thereby allowing for a match of the linear speed of said upper and lower punch means while in operative contact with the upper and lower precompression wheels respectively, with that of any other press machine having punch means and precompression wheels of the same shape and dimensions.

6. The apparatus of claim 3 having a variable speed motor drive with a programmable control which motor drive is arranged and constructed to be operatively engageable with said lower punch means so as to allow for a match of the linear speed of said lower punch means, while said lower punch means is in contact with said replaceable cam means, with that of any other press machine having lower punch means and ejection cams of the same shape and dimensions.

7. The apparatus of claim 4 having a plurality of force, speed and punch displacement sensing means for measuring parameters of the powder compression cycle.

8. The apparatus of claim 7 wherein said sensing means are in operative connection with a plurality of computerized display means.

9. The apparatus of claim 1 wherein said cavity means movement is linearly driven between said compression wheels at a constant speed.

10. A linear press simulation apparatus having a lower compression wheel and an upper compression wheel, said lower compression wheel being constructed and arranged to be operatively engageable wit a lower punch means and said upper compression wheel being constructed and arranged to be operatively engageable with an upper punch means, said lower and upper means being arranged in opposed orientation to each other in a powder pressing cavity means, said cavity means is arranged and constructed to be driven at a constant linear speed between said upper and lower compression wheels to allow compression of powdered material provided therein, said apparatus being characterized by providing replaceable lower and upper compression wheels so that the apparatus can be configured to match the exact geometry of other press machine having compression wheels of the same shape and dimensions.

* * * * *